Inventor:
William S. Fraula
By: Belt and Wallace
Attorneys.

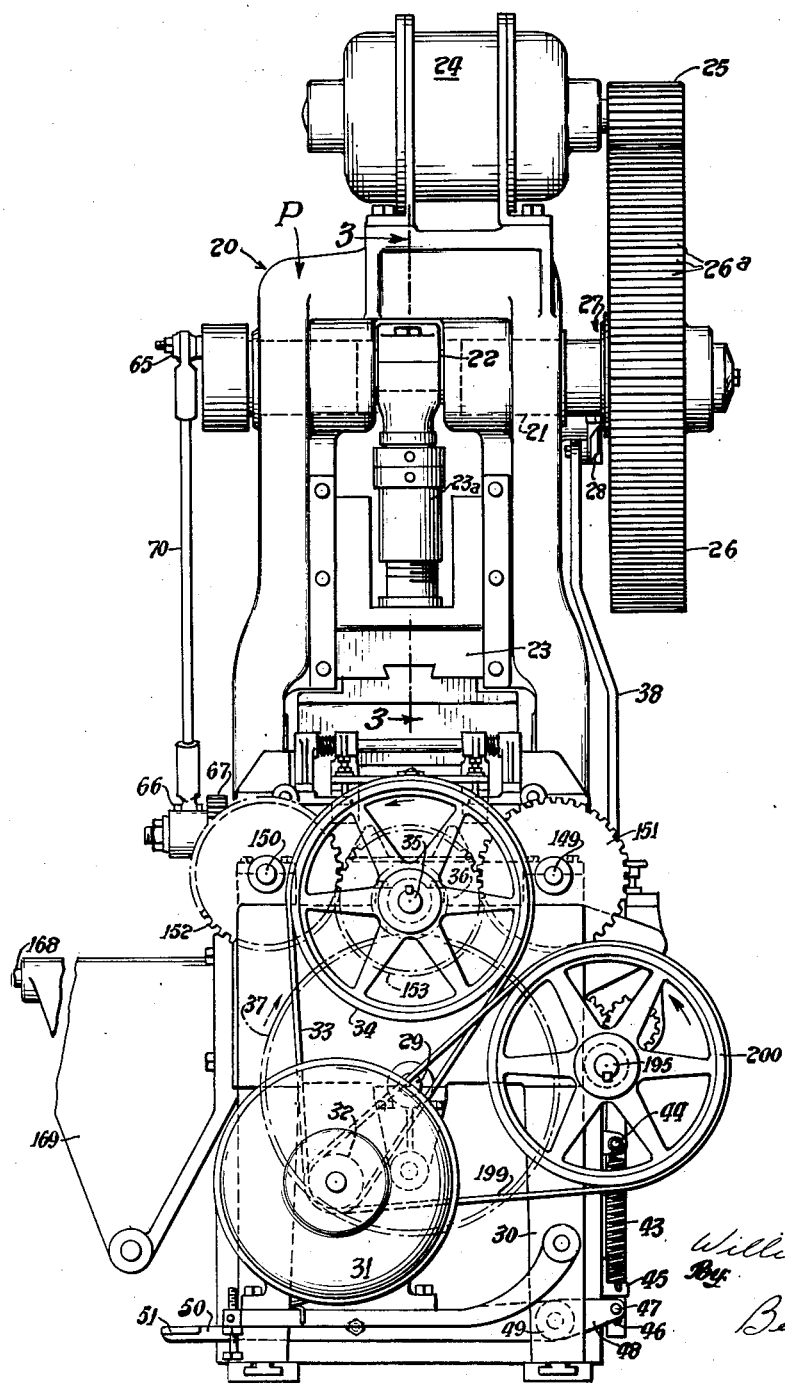

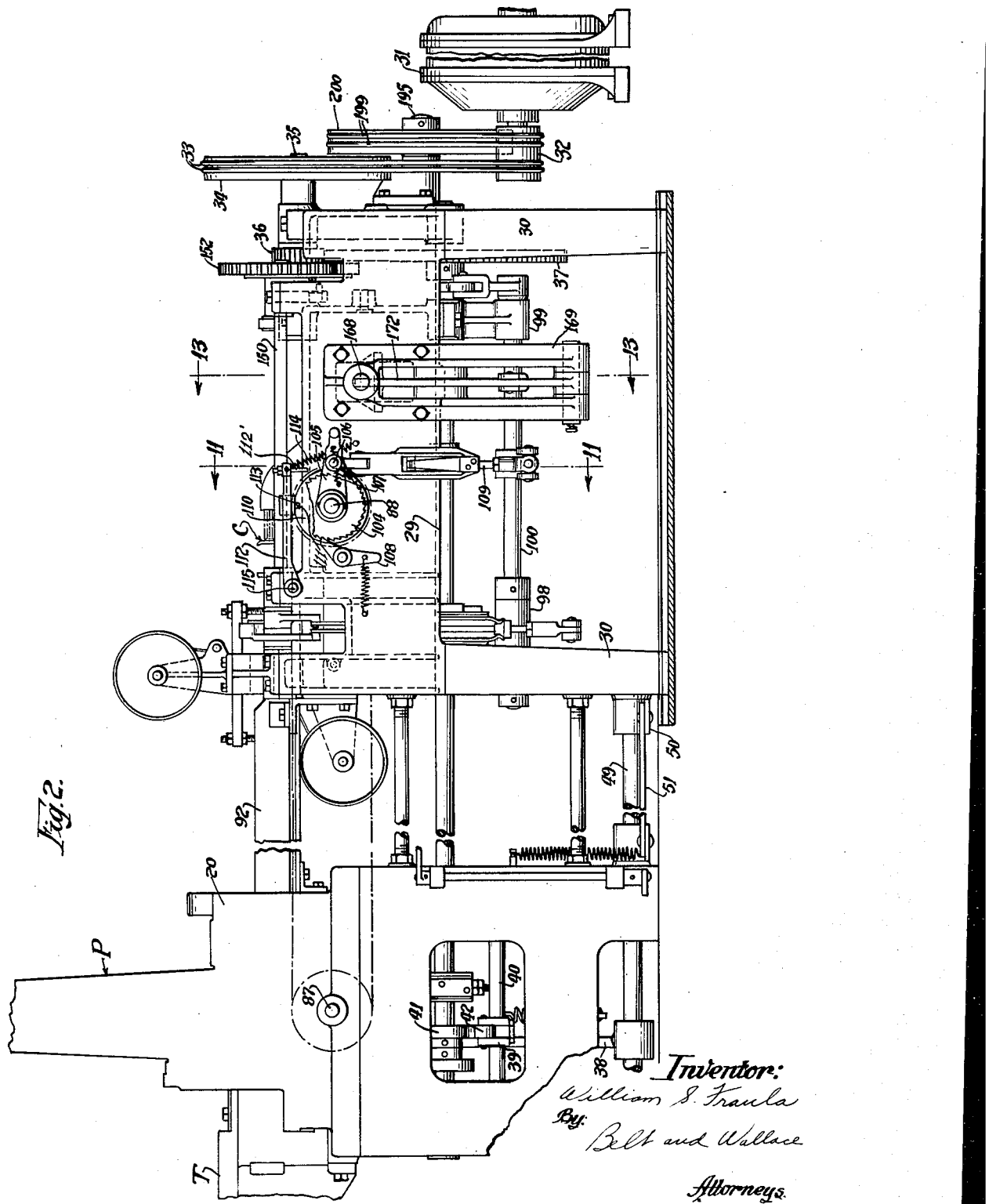

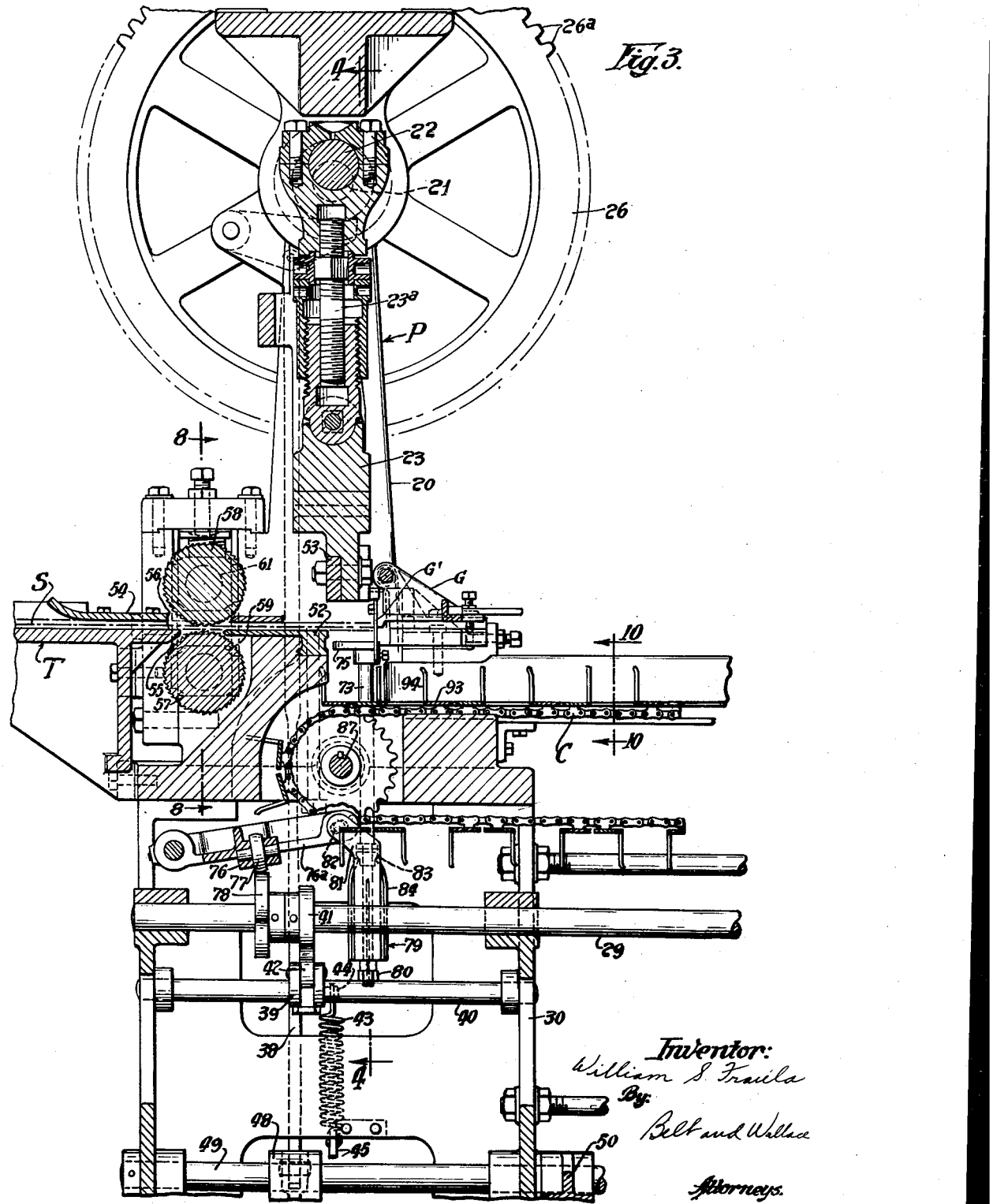

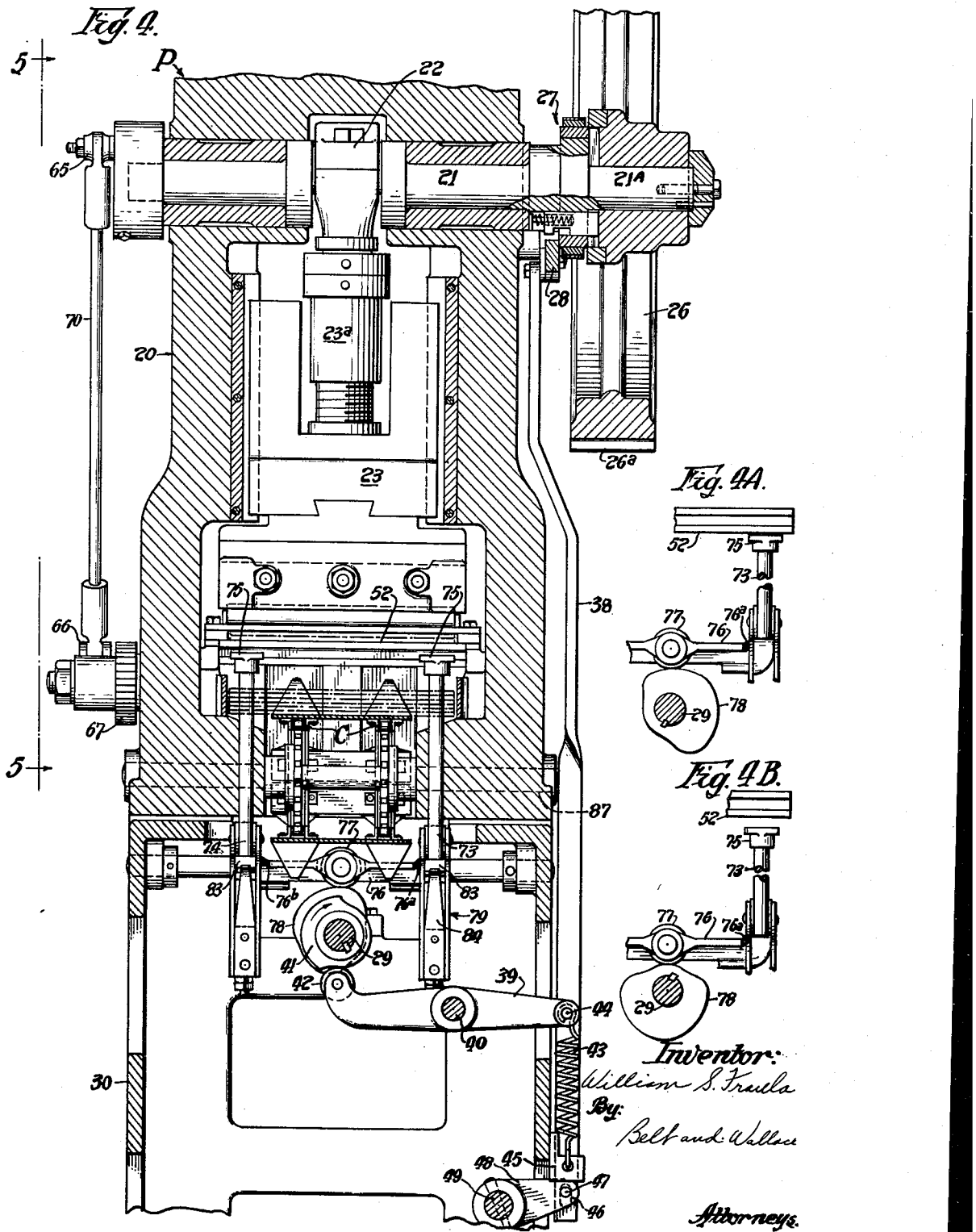

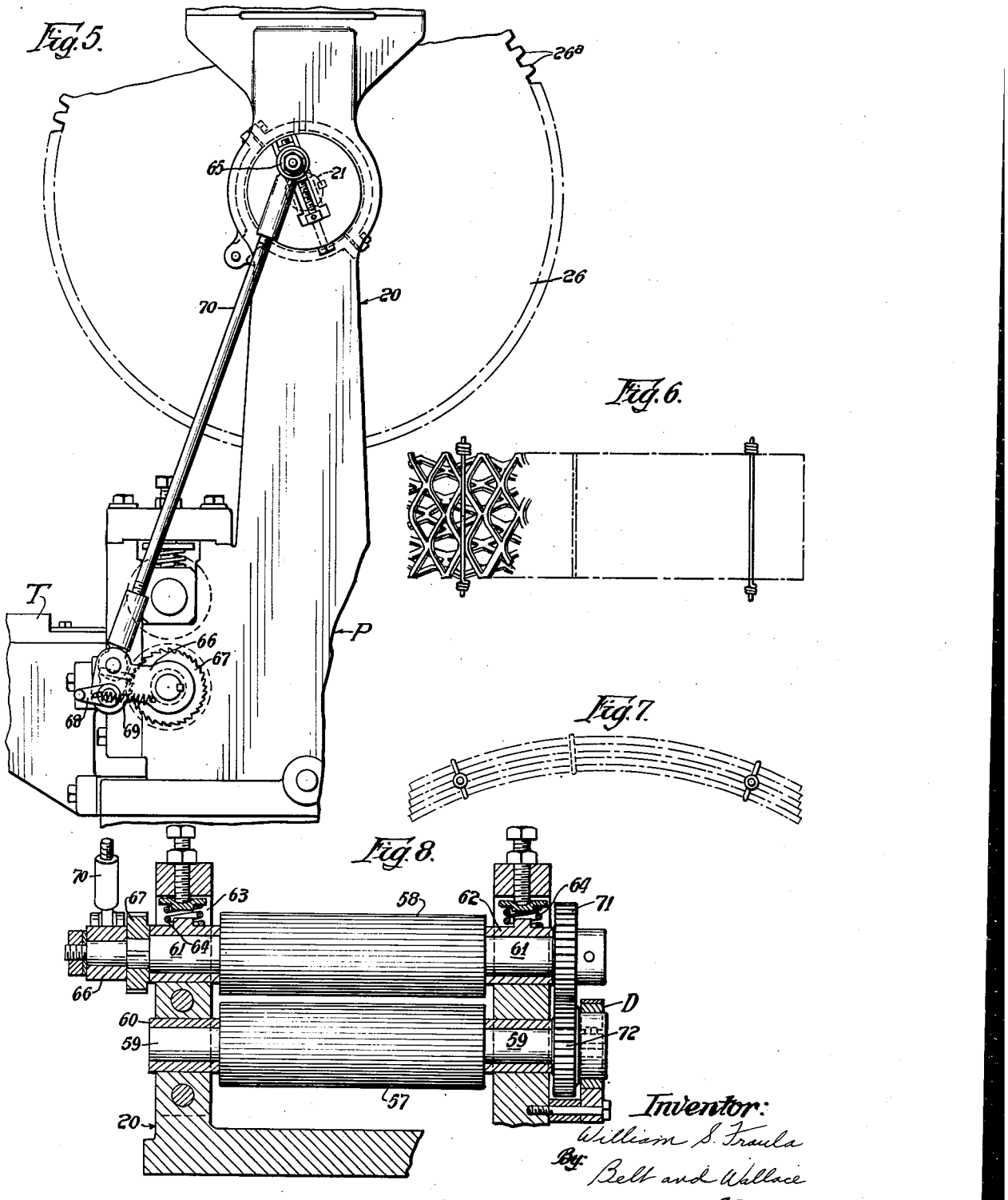

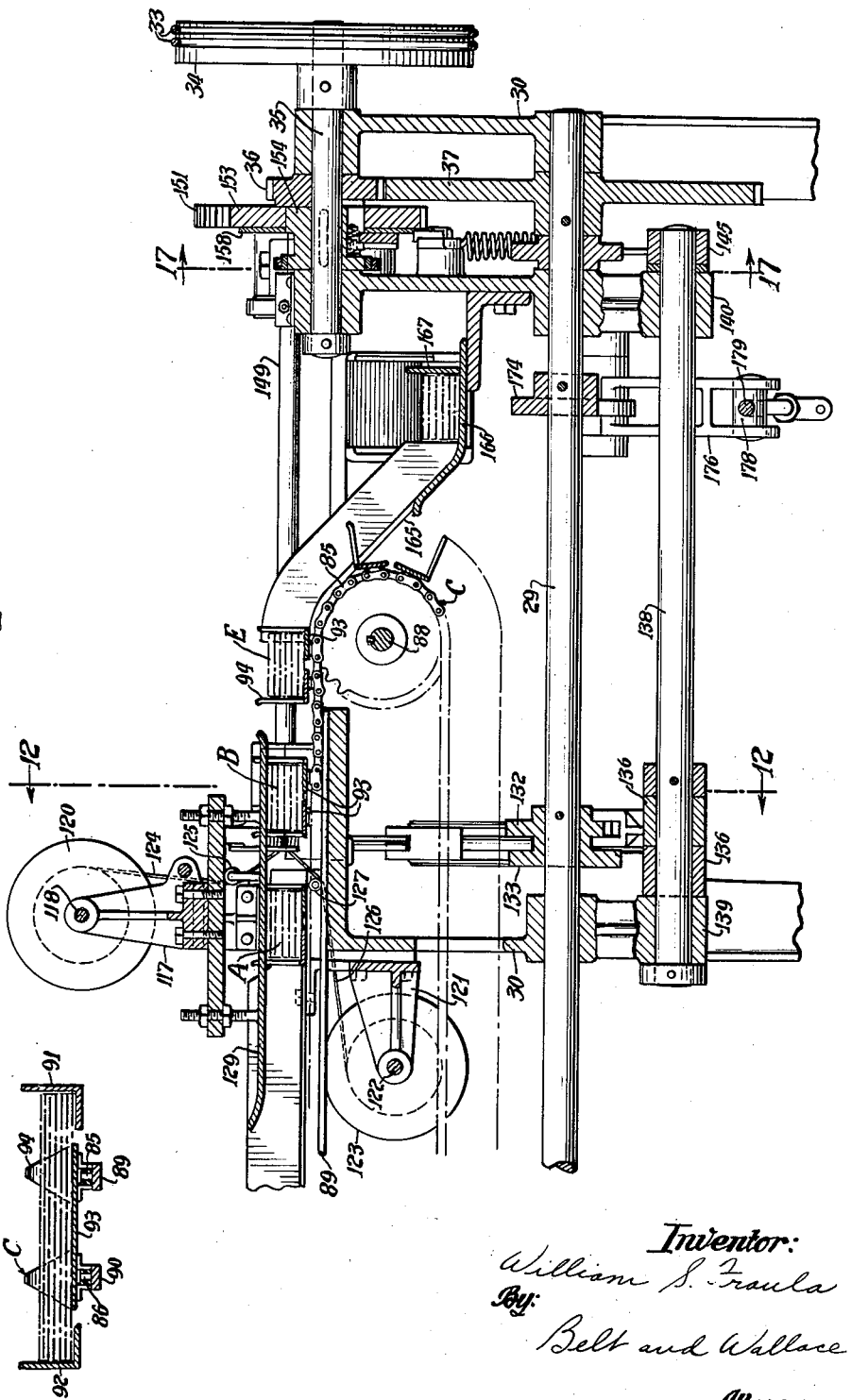

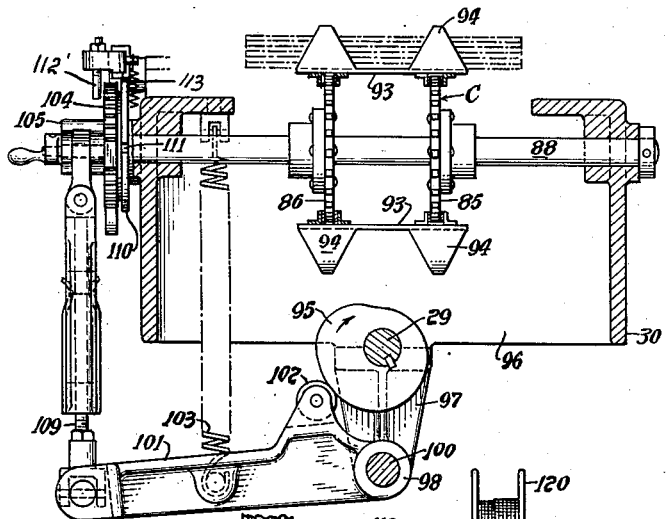

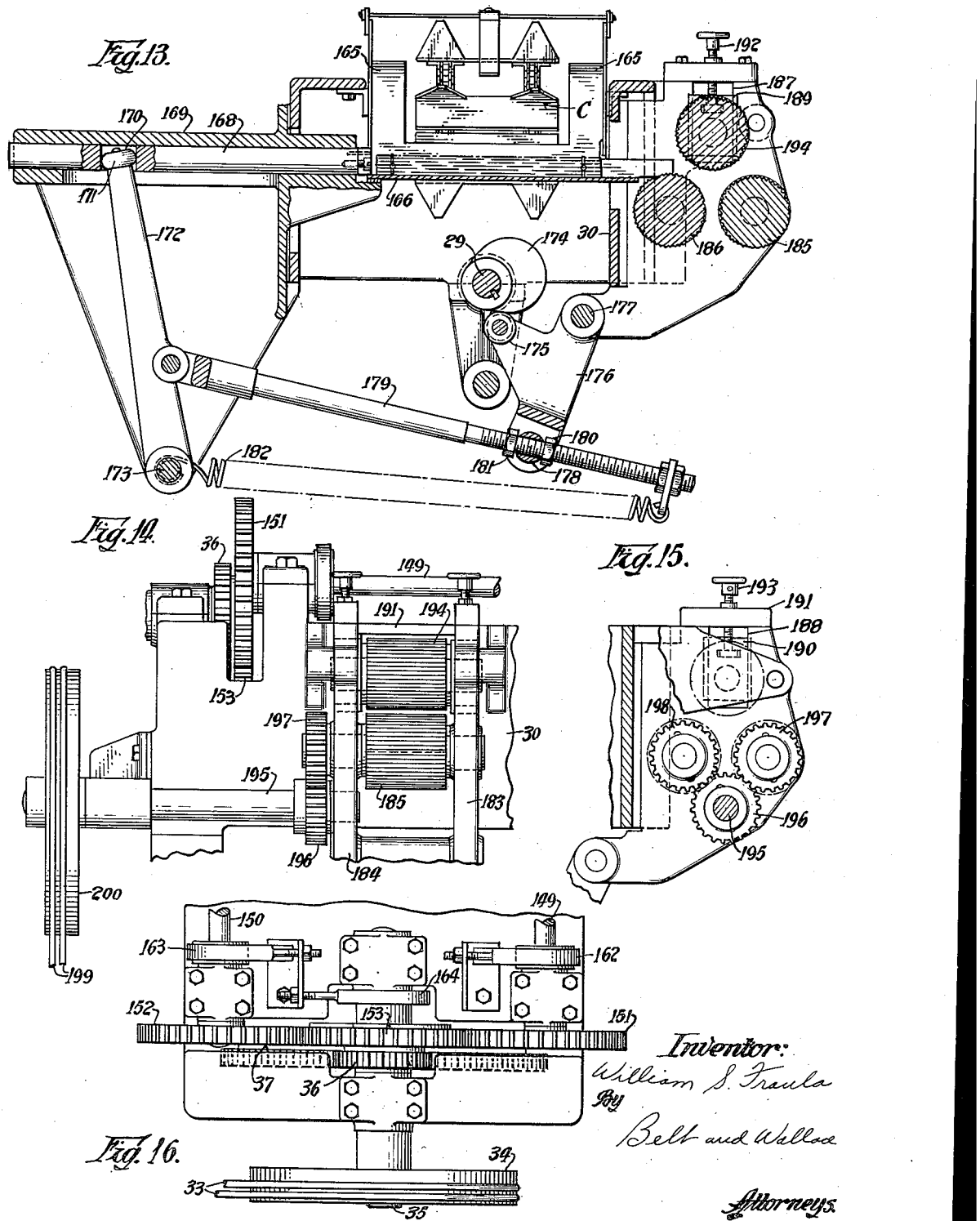

Patented Jan. 23, 1940

2,188,146

UNITED STATES PATENT OFFICE 2,188,146

MACHINE FOR MANUFACTURING BRAKE SHOE INSERTS

William S. Fraula, Suffern, N. Y., assignor to The American Brake Shoe and Foundry Company, Wilmington, Del., a corporation of Delaware Application June 8, 1937, Serial No. 147,026

15 Claims. (Cl. 100—31)

This invention relates to the production of expanded metal inserts for brake shoes and similar castings and, while the invention is so entitled and will be explained hereinafter with particular reference to the production of such inserts, it is to be understood that it is adaptable for other usages and especially to those entailing the handling of material likely to cut or otherwise injure the hands of those employed in the production of articles from such material and also in those instances where the material does not freely slide upon itself or entails other kindred handling problems.

The use of reenforcing inserts of expanded metal in railway brake shoes and similar castings is a common practice and it has been determined that the most economical and satisfactory manner of producing such inserts is to first cut large sheets of expanded metal into blanks of proper size, to then stack these blanks one upon the other to afford inserts of the desired thickness, and to subsequently so bind the stacks or bundles of such blanks that the bundles can be handled as units. Moreover, where the bundles are to serve as inserts for railway brake shoes or other curved castings, a curvature similar to the desired curvature of the castings in which the bundle is to be used is imparted to the bundles as a step in the production thereof.

Expanded metal is typical of a material which entails many problems in the handling thereof. In the first place it is replete with sharp edges and projecting portions which makes it difficult to handle and it has been found that operatives employed in the production of articles from such material frequently suffer injurious cuts on their hands. While gloves may be worn, it is necessary to use gloves of heavy material which will not readily tear and this makes the gloves clumsy and impairs the efficiency of the operatives. Furthermore, expanded metal catches on the clothing of the operatives and causes rips and tears and is otherwise subject to objections especially in so far as the manual handling thereof is concerned.

But at least equally important with the foregoing is another serious disadvantage in the handling of expanded metal which arises particularly where sheets of expanded metal are cut into blanks. This disadvantage is that it is almost impossible to slide one blank cut from expanded metal across another. It should be noted that there are other materials that are subject to this same and kindred objections. Hence one of the important objects of this invention is to facilitate the handling of blanks made of material possessing characteristics that makes it difficult to slide the blanks one upon the other and of which material expanded metal is an excellent example, and another important object is to eliminate as far as possible the manual handling of such material in the production of articles therefrom so as to avoid likelihood of injury to the operatives, tearing of the operatives' clothing, and the like.

Still another important object of the invention is to automatically produce articles such as bundles or inserts, suitable for use in castings or the like, from a material such as expanded metal, and other objects ancillary to the foregoing are to cut blanks of proper size for the articles from sheets of expanded metal or the like; to automatically stack blanks so cut from sheets of expanded metal or the like one upon the other to thereby provide articles of desired thickness and consisting of a plurality of layers; to securely bind the stacked blanks to afford bundles that may be handled as units; and to impart a desired curvature or other configuration to the bundles to thereby render the bundles ready for use upon discharge thereof from the machine in which the just enumerated objects are realized.

Further objects of the invention are to provide a machine wherein various operating parts are provided for effecting predetermined operations and to so time the operation of the operating parts that a plurality of operations may be effected simultaneously; to so interconnect the operating parts to the driving means therefor that likelihood of injury to such parts in event of improper or unanticipated operation will be prevented; and to so drive the operating parts that the timed relation thereof may be maintained and power may be directly applied to those parts of the apparatus performing the heaviest duty and subjected to the highest strains.

Other and more specific objects of the invention are to so control the operation of the means cutting blanks from sheets of expanded metal or the like that a varied number of blanks may be cut from a sheet of expanded metal in a particular cycle of operation of the machine; to facilitate stacking of blanks cut from sheets of expanded metal or the like by so regulating the operation of the blank receiving means that the blanks may be maintained substantially level while passing into the stacking means whereby catching of projecting portions on the blanks one upon the other may be avoided; to index stacks of blanks cut from expanded metal or the like from one operating part of the machine to another; to automatically and securely bind stacked blanks to thereby enable bundles of blanks to be handled as units; and to automatically pass the bound bundles to means for imparting a curvature or other configuration to the bundles.

Other and further objects of the invention will become apparent as the following description proceeds wherein reference is made to the accompanying drawings in which Fig. 1 is an end view of a machine embodying my invention;

Fig. 2 is an elevational side view looking at the machine from the left-hand side of Fig. 1;

Fig. 3 is a vertical sectional view substantially on the line 3—3 on Fig. 1;

Fig. 4 is a vertical sectional view taken transversely of the view shown in Fig. 3 and substantially on the line 4—4 on Fig. 3;

Figs. 4A and 4B are fragmentary detail views showing successive positions occupied by the means receiving the blanks cut from sheets of expanded metal in the machine;

Fig. 5 is a side detail view taken substantially on the line 5—5 on Fig. 4;

Fig. 6 is a plan view of one of the bundles produced in the illustrated machine;

Fig. 7 is a side elevation of the bundle shown in Fig. 6;

Fig. 8 is a vertical sectional detail view taken substantially on the line 8—8 on Fig. 3;

Fig. 9 is a fragmentary longitudinal vertical sectional view of the parts shown at the right-hand end of Fig. 2;

Fig. 10 is a detail view taken substantially on the line 10—10 on Fig. 3;

Fig. 11 is a vertical transverse sectional view taken substantially on the line 11—11 on Fig. 2;

Fig. 12 is a vertical transverse sectional view taken substantially on the line 12—12 on Fig. 9;

Fig. 13 is a vertical transverse sectional view taken substantially on the line 13—13 on Fig. 2;

Fig. 14 is a fragmentary detail view showing the discharge end of the means for imparting curvature to the bundle illustrated in Figs. 6 and 7;

Fig. 15 is a fragmentary detail view showing the drive for the parts illustrated in Fig. 14;

Fig. 16 is a fragmentary top plan view of the parts shown at the right in Fig. 9;

Figure 17:
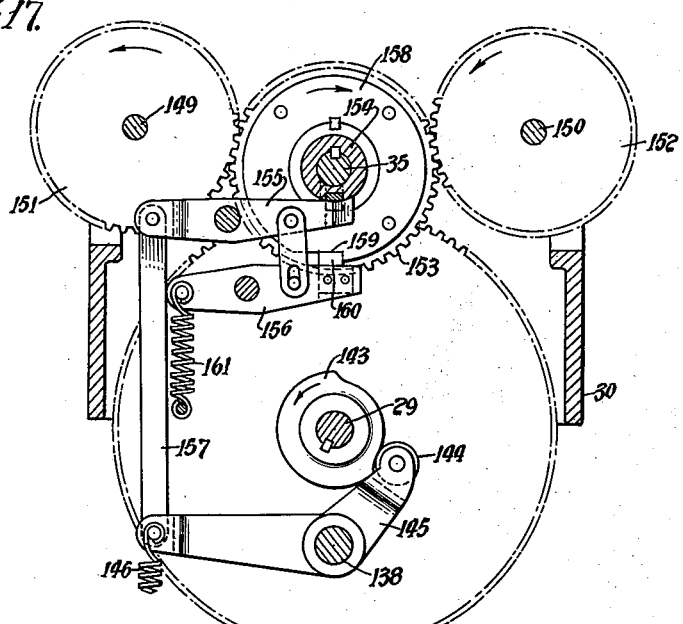
Fig. 17 is a sectional detail view taken substantially on the line 17—17 on Fig. 9.

At what may be called the rear end of the machine and which appears at the left in Fig. 2 is a punch press P comprising a frame generally indicated by 20 having a crank shaft 21 journaled therein at the upper end thereof, the throw 22 of this crank shaft being disposed substantially midway between the side members of the frame 20. The ram 23 of the press is connected to the throw 22 by the usual pitman 23a to be reciprocated vertically in the operation of the press. Power for operating the shaft 21 of the press is supplied from a motor 24 mounted on the top of the frame 20 and under control of a suitable switch device (not shown) that is suitably mounted at a convenient position on the machine. A pinion 25 on the shaft of motor 24 meshes with a gear 26a formed on the flywheel 26 that is rotatable on a shaft 21A (Fig. 4) supported by the frame 20 in alignment with the shaft 21 and which, if desired, may be a part of the shaft 21. A clutch generally indicated by 27 is interposed between the flywheel 26 and the shaft 21 and is under control of the throw-out dog 28. When the dog 28 is retracted the clutch 27 connects the shaft 21 to the flywheel 26 whereupon the ram 23 is reciprocated. By holding the dog 28 retracted for a predetermined time the ram 23 may be caused to make one, two, three, four or more reciprocations in each cycle of operation of the machine.

In order to insure positive timed operation of the various operating parts of the machine a cam shaft 29 is provided which extends longitudinally of the machine. The cam shaft is suitably journaled in the frame 30 that extends forwardly from the frame 20 of the press P.

A motor 31 is provided which has a pulley 32 fast on the shaft thereof. A belt 33 is passed about the pulley 32 and about a pulley 34 fast on the shaft 35 (Fig. 9) suitably journaled in the frame 30 at the front end thereof. A pinion 36 fast on the shaft 35 meshes with a gear 37 fast on the cam shaft 29, the ratio between said pinion and gear being substantially three to one. Hence when the motor 31 is set in operation the cam shaft 29 is rotated.

Operation of the motor 31 is under control of a suitable switch device (not shown) mounted at a convenient place on the machine so as to be readily accessible to the operator. Preferably, in accordance with the usual custom in the art, the switch device consists of a start button which may be pressed to set the motor 31 in operation and a stop button which is pressed when it is desired to interrupt operation of this motor. As will be understood, a plurality of such switch devices may be provided in convenient places on the machine to facilitate control of operation of the motor 31.

The operation of the various operating parts of the machine is effected under control of cams provided on the shaft 29 as will be more fully explained hereinafter.

Thus, in order to control operation of the throw-out dog 28 and consequently the ram 23, a link 38 is suitably connected to the throw-out dog 28. A rocker 39 (Fig. 4) is mounted on the shaft 40 journaled in the frame 20 of the press P. A peripheral cam 41 is fast on the cam shaft 29 and a cam follower roller 42 is mounted at one end of the rocker 39. A spring 43 has one end thereof connected to a pin 44 that interconnects the rocker 39 with the link 38. The other end of the spring 43 is suitably connected to an anchor plate 45 fast on the frame 20. When the roller 42 passes from a rise on the cam 41 onto the relieved part of this cam the link 38 is pivoted downwardly to retract the dog 28 to set the ram 23 in operation, the parts being shown in this position in Fig. 4. The length of the relieved part of the cam 41 determines the length of time the dog 28 will be retracted and this in turn determines the number of reciprocations that will be made by the ram 23. The illustrated arrangement is such that the dog 28 will be retracted for a sufficient period of time to permit the ram 23 to make three reciprocations in each cycle of operation of the machine which is to say one revolution of the cam shaft 29 and consequently of the cam 41. It will of course be apparent that when the roller 42 passes back onto the rise on the cam 41 the link 38 is moved upwardly to reposition the dog 28 in position to disengage the clutch 27.

It will be understood that the operating speed of the shaft 21 is faster than the operating speed of the cam shaft 29 in order that the ram of the press may make a plurality of reciprocations if desired during one revolution of the shaft 29.

It may happen that it will be desirable to quickly interrupt operation of the ram 23 once it has been set in operation by action of the cam 41. This is preferably effected manually and to this end a slot 46 is provided at the lower end of the link 38 into which a pin 47 is extended. The pin 47 is carried at the outer end of an arm 48 fast on the shaft 49 journaled in suitable bearings provided in the frames 20 and 30 in alignment with one of the side frames of the press P. Arms 50 (Fig. 1) are fast to the shaft 49 and extend across the machine to project beyond the opposite side thereof to be in a position where an operator of the machine will usually stand. A treadle 51 is fast to the free ends of the arms 50.

When the press is in operation the operator may step on the treadle 51 and thereby move the link 38 upwardly which will cause the dog 28 to move from retracted position and effect disengagement of the clutch 27 whereby rotation of the shaft 21 and consequently reciprocation of the ram 23 will be interrupted. The length of the slot 46 and the disposition thereof relative to the pin 47 is such that the link 38 may be moved by the rocker 39 under control of the cam 41 without moving the shaft 49 and the treadle 51.

A stationary cutter 52 (Fig. 3) is provided on the bed of the press P. A cutter 53 is mounted at the lower end of the ram 23 and in the reciprocation of the ram 23 cooperates with the stationary cutter 52 to shear material disposed over said stationary cutter.

In the present instance, as has been explained, the material to be sheared by the cutters 52 and 53 is expanded metal which, in the present instance, is in the form of sheets. Preferably the sheets are of a width corresponding to the desired length of the inserts so that only one cut will be necessary in order to afford a blank of a desired size. Sheets of expanded metal S are fed into the press by automatic means to be explained presently.

In Fig. 6 the expanded metal is illustrated and by referring thereto it will be seen that the metal is expanded so as to comprise substantially diamond-shaped openings longer between two opposite corners thereof than between the other two opposite corners. Preferably, though not necessarily, the sheets S of expanded metal are fed to the press P in pairs. When this is done it is desirable to have the longer length of the diamond-shaped openings in one sheet of expanded metal extended at right angles to the longer length of the diamond-shaped openings in the other layer. The expanded metal illustrated in Fig. 6 is arranged in this manner.

An elongated table T, which is only fragmentally illustrated, is secured to the rear side of the press P and the sheets of expanded metal are rested on this table T and fed forwardly to pass under a guide plate 54 (Fig. 3) disposed above and spaced from the table, in the present instance, in an amount sufficient to enable two sheets of expanded metal to pass between it and the top of the table T.

An opening 55 is provided in the table T and an opening 56 is provided in the plate 54 in alignment with the opening 55. A part of the periphery of a roller 57 extends through the opening 55 and a part of the periphery of a roller 58 extends through the opening 56. The roller 57 is provided with trunnions 59 (Fig. 8) journaled in bearing sleeves 60 fixedly mounted in the frame 20 of the press P. Roller 58 is provided with trunnions 61 journaled in bearing sleeves 62. The bearing sleeves 62 are mounted for floating movement in relatively enlarged openings 63 provided in the frame 20. Springs 64 in the openings 63 act on the bearing sleeves 62 to force the roller 58 toward the roller 57, suitable means such as those illustrated in Fig. 8 being provided to adjust the tension of the springs 84. The peripheries of the rollers 57 and 58 are preferably longtiudinally fluted and this, in cooperation with the yieldable urging of the roller 58 toward the roller 57, enables the sheets S of expanded metal passed below the guide plate 54 to be firmly clamped in the bite between the rollers 57 and 58.

Intermediate downward movements of the ram 23 in the operation of the press the rollers 57 and 58 are operated to advance the sheets of expanded metal past the cutter 52 in an amount equal to the desired width of the blanks to be cut from the sheets of expanded metal. The means for effecting such operation of the rollers 57 and 58 include the adjustable crank 65 (Fig. 5) mounted at the end of the shaft 21 opposite the clutch 27. An arm 66 is rockably mounted on an extension provided on one of the trunnions 61 of the roller 58. A ratchet wheel 67 is interposed between the arm 66 and the shoulder on the just mentioned trunnion 61 and is fast to said trunnion. A pawl 68 is mounted on the arm 66 and cooperates with the ratchet 67. The pawl 68 is so arranged that it may be held in an over-center position by the springs 69 to be engaged with the teeth of the ratchet 67 but said pawl may be swung past center so that the springs 69 will serve to hold the pawl disengaged from the teeth of the ratchet 67, this being resorted to when it is desired to render the feeding action of the rollers 58 and 57 inoperative.

A gear 71 (Fig. 8) is fast to the trunnion 61 opposite that on which the arm 66 is mounted and this gear meshes with a gear 72 fast on the trunnion 59 of the roller 57 associated with the last mentioned trunnion 61. The ratio between the gears 71 and 72 is one to one so that the rollers 57 and 58 operate synchronically inasmuch as these rollers are of equal diameter.

A link 70 (Fig. 5) interconnects the adjustable crank 65 and the arm 66, and movement imparted to the crank 65 is transmitted through this link to the arm 66. The adjustable crank 65 enables the amount of movement imparted through the link 70 to the arm 66 to be adjusted whereby the amount of feeding movement of the rollers 57 and 58 may be adjusted.

In order to prevent overrunning of the rollers 57 and 58 a tension device D (Fig. 8) acts on one of the trunnions 59 of the roller 57, said tension device preferably being of the adjustable friction type.

An adjustable gauge device G (Fig. 3) is mounted on the bed of the press P and the operation of the rollers 57 and 58 is so adjusted that the leading edges of the sheets S are fed into engagement with gauge plate G' of this device in each operation of the rollers 57 and 58 whereby blanks of uniform width are cut in successive operations of the ram 23.

During rotation of the shaft 21 and during downward movement of the ram 23, the link 70 moves downwardly and when the pawl 68 is arranged to cooperate with the teeth of the ratchet 67 said pawl freely rides over these teeth during this downward movement. However, shortly after the ram 23 starts to move upwardly the pawl 68 seats in one of the teeth of the ratchet 67 and thereupon movement is imparted to the rollers 58 and 57. As stated before, the amount of movement so imparted to the rollers 57 and 58 determines the extent to which the sheets S of expanded metal clamped between these rollers will be fed beyond the stationary cutter 52 which in turn determines the width of the blanks cut from the sheets S, the operation being such, however, that the leading edges of the sheets engage the plate G' in advancing movement thereof. It will be appreciated that after a portion of the expanded metal has been fed past the stationary cutter 52 and the ram 23 is caused to descend, the cooperation of the cutter 53 with the cutter 52 will cause those parts of the sheets extended beyond the cutter 52 to be severed from the sheets to provide blanks.

It has been explained heretofore that because of the uneven edges of the blanks cut from expanded metal and the presence of projections on these edges and the like, it is difficult to cause one blank cut from expanded metal to slide upon another. In fact it is difficult to cause such blanks to slide properly over a smooth surface. Furthermore, it is desirable that an insert for a brake shoe consist of several layers of blanks such as are cut from expanded metal in the above described operation. Thus, if the blanks were cut from the sheets S and caused to fall they might become jammed in a cocked position. Furthermore, if one blank had already been cut and dropped and it was desired to cut and drop another on top of the first blank, it is unlikely that the two blanks would ever become arranged in parallel relation.

Because of the foregoing and to insure neat stacking of the cut blanks, I provide means which I will call leveling fingers, for receiving the blanks as they are cut from the sheets of expanded metal. A vertical movement is imparted to these leveling fingers so that when the first blanks for a stack or bundle of blanks which will afford an insert are cut the leveling fingers lie immediately below the blank so that when it is cut it will promptly rest upon the leveling fingers without falling any appreciable distance. The leveling fingers are then lowered so that when the next blank is cut it will properly rest upon the preceding blank and will not be required to fall any appreciable distance. If additional blanks are to be stacked upon those already stacked, the leveling fingers lower still further. This operation is continued until as many blanks as desired have been stacked upon the leveling fingers whereupon the stack or bundle of blanks is removed from the leveling fingers in a manner to be described hereinafter and thereafter the leveling fingers are moved upwardly to be returned to their initial blank receiving position.

Such leveling fingers in the present instance include a pair of plungers 73 and 74 (Fig. 4) that are mounted for reciprocal movement in vertical extending bores provided in the frame 20. Pads as 75 are provided at the upper ends of the plungers 73 and 74 and blanks cut from the sheets S are supported by these pads as soon as they are severed from the sheets S.

Vertical movement is imparted to the plungers 73 and 74 from a yoke 76 (Figs. 3 and 4) which has a roller 77 journaled therein. The roller 77 rests on a peripheral cam 78 fast on the cam shaft 29.

The plunger 73 extends through a connecting device generally indicated by 79 and has a nut 80 provided at the lower end thereof for limiting movement of the plunger relative to the connecting device 79 in one direction. An arm 81 (Fig. 3) extends from the connecting device 79 and is connected to an arm 76a of the yoke 76 by a pin and slot connection 82. A block 83 is fast on the plunger 73 and as best shown in Fig. 3 is relieved in its lower portion to provide a pair of oppositely disposed downwardly facing shoulders. A pair of spring arms 84 bear against the downwardly facing shoulders on the block 83 and serve to connect the connecting device 79 to the plunger 73. A similar arrangement is provided for connecting the arm 76b of the yoke 76 to the plunger 74. The yieldable connection afforded by the downwardly facing shoulders on the block as 83 and the spring arms as 84 enables separation of the plunger from the means imparting movement thereto in event anything obstructs free movement of these plungers.

During the time the first blanks for a stack or bundle of blanks are being cut from the sheets S the roller 77 engages the highest part of the cam 78 and holds the plungers 73 and 74 and the pads 75 thereon in their uppermost position illustrated in Figs. 3 and 4. After the first blanks have been cut from the sheets and have fallen onto the pads 75, the cam 78 will have rotated with the cam shaft 29 in an amount sufficient to bring the roller 77 into engagement with the next lowermost part thereon wherefore the plungers 73 and 74 and the pads 75 thereon will have been lowered in an amount sufficient to permit the next blanks cut from the sheets S to fall upon the blanks already resting upon the pads 75 without requiring that the newly cut blanks slide over the blanks resting on the pads 75. The parts are illustrated in this position in Fig. 4A. Immediately after this the cam 78 will have rotated in an amount sufficient to bring the roller 77 into engagement with the lowermost portion of the cam 78, at which time the parts will be in the position illustrated in Fig. 4B, and when in this position the next blanks cut from the sheets S will neatly fall upon the blanks already supported by the pads 75 without necessity of sliding thereover.

If additional blanks were to be stacked on those already cut the roller 77 would not yet be engaging the lowermost part of the cam. However, in the present instance, the arrangement is such that three sets of blanks are to be stacked one upon the other to afford a bundle or insert and therefore the roller 77 engages the lowermost part of the cam 78 at the time the third set of blanks is cut from the sheets S. Immediately after the third set of blanks is cut and deposited it is carried away from the pads 75 and the roller 77 thereafter engages a sharp rise on the cam 78 which restores the pads 75 to their initial blank receiving position whereupon the above described operation is repeated.

It is to be understood that the various steps in the cam 78 are so graduated that the pads are lowered in steps of sizes proportionate to the thickness of the blanks, the sizes of the steps being varied according to variations in the thicknesses of the blanks.

In order to carry blanks cut from the sheets S and stacked in the foregoing manner out of the press P to the other operating parts of the machine, a conveyor C is provided. The conveyor C comprises a pair of endless chains 85 and 86 which are passed about sprockets respectively mounted in spaced apart relation on the shafts 87 and 88 (Fig. 2). The shaft 87 is suitably journaled in the frame 20 while the shaft 88 is journaled in the frame 30 about midway in the longitudinal extent thereof.

As best shown in Figs. 9 and 10, supporting guides 89 and 90 are disposed below the upper reaches of the chains 85 and 86 to prevent undue sagging. L-shaped guide strips 91 and 92 extend forwardly from the frame 20 to the tying mechanism to be described in further detail hereinafter, these strips being disposed outwardly of the chains 85 and 86. The horizontally disposed parts of the guide strips 91 and 92 are arranged substantially in alignment with the top surfaces of the upper reaches of the chains 85 and 86. Cooperating pairs of bundle receivers are mounted on the chains 85 and 86 in spaced apart relation. Each bundle receiver comprises a bottom plate as 93 and upwardly extending fingers as 94, (Fig. 10) the parts 93 and 94 being arranged in a substantially right-angular relation. The bundle receivers in each pair are oppositely faced as shown in Fig. 9.

In a manner to be described presently the conveyor C is indexed in a step by step manner. The pairs of bundle receivers are so spaced on the conveyor and movement of the conveyor is so arranged that during each at rest interval in the step by step movement a pair of bundle receivers are aligned with the pads 75 as is illustrated in Fig. 3. Furthermore, the upper reaches of the chains 85 and 86 are so positioned vertically that when the pads 75 attain their lowermost position the bottom-most blanks carried by the pads 75 will rest upon the bottom plates 93 of the pair of bundle receivers aligned with the pads. As best shown in Fig. 4, the plungers 73 and 74 and the pads 75 thereon are arranged outwardly of the chains 85 and 86 and the parts carried thereby.

The operation is so timed that after the pads 75 attain their lowermost position advancing movement is imparted to the conveyor C to index the pair of bundle receivers which have just received a bundle of blanks from bundle receiving position and to bring another pair of bundle receivers into bundle receiving position which position is attained prior to the time the pads 75 again start their downward movement.

Advancing movement is imparted to the conveyor C by the cam 95 (Fig. 11) fast on the cam shaft 29. A reenforcing web 96 extends between the side plates of the frame 30. A bracket 97 depends from this reenforcing web and provides a bearing 98. Another bearing 99 (Fig. 2) is carried by the frame 30 forwardly of the bearing 98 and a shaft 100 is journaled in these bearings. A rocker 101 is mounted on the shaft 100 and carries a cam follower roller 102 that is urged against the peripheral cam 95 by a spring 103 extending between the rocker 101 and a spring anchor on the frame 30. A ratchet 104 (Figs. 2 and 11) is fast on the shaft 88 outwardly of one of the side members of the frame 30. An arm 105 is rockably mounted on the shaft 88 outwardly of the ratchet 104 and carries a pawl 106 which is acted on by a spring 107 which when disposed over center urges the pawl 106 into engagement with the teeth in the ratchet 104, the arrangement being such that when the pawl is pivoted to throw the spring past center said spring will hold said pawl out of engagement with the teeth of said ratchet. A retaining pawl 108 acts on the ratchet 104 to prevent rearward movement thereof. A link 109 interconnects the rocker 101 and the arm 105. This link is provided with a connecting device similar to the connecting device 79 so that in event of jamming the rocker 101 may operate freely without damage to the mechanism normally driven thereby.

An indexing plate 110 (Figs. 2 and 11) is fast on the shaft 88 adjacent the ratchet 104. Notches 111 are provided at spaced intervals in the periphery of the indexing plate 110. An arm 112 carrying the stud 113 is urged toward the periphery of the indexing plate 110 by a spring 114, said arm being mounted on the frame 30 as indicated at 115 (Fig. 2). The spacing between the notches 111 corresponds to the spacing of the bundle receivers on the conveyor C.

As the roller 102 rides onto a lower part of the cam 95 the rocker 101 moves upwardly under the action of the spring 103 and the pawl 106 freely rides over the teeth of the ratchet 104. As the arm 105 ascends, it will engage the lower end of the stud 112', which depends from the end of the arm 112, and the arm 112 will therefore be lifted to withdraw the stud 113 from engagement with a notch 111 in the index plate 110. However, as the roller 102 passes onto a rise on the cam 95, the rocker 101 starts to move downwardly and the pawl 106 seats in a tooth of the ratchet 104 and imparts rotative movement to said ratchet and consequently the shaft 88 which imparts advancing movement to the conveyor C. At the end of downward movement of the rocker 101 the stud 113 will be in alignment with the succeeding notch 111 in which it will seat to hold the conveyor C in its newly attained position. The yieldable connection afforded by the link 109 and associated mechanism enables the rocker 101 to complete its downward movement notwithstanding that the engagement of the stud 113 with a notch 111 in the index plate 110 may have halted the rotation of the shaft 88 and ratchet 104.

After the bundles have been picked up from the pads 75 by the bundle receivers they are carried forwardly in the step by step movement of the conveyor C to the means for securing the stacked blanks into bundles which may be handled as units. This means has been referred to heretofore as the tying mechanism. The tying mechanism employed in the present machine is of the kind shown and described in my copending application Serial No. 735,380, filed July 16, 1934, to which application reference may be had for the particular details of construction and operation which will now be only generally described.

The tying mechanism illustrated includes a pair of brackets 116 and 117 (Fig. 12) which are mounted on top of the frame 30 and which support a shaft 118 on which spools of wire 119 and 120 are rotatably mounted. Another pair of brackets as 121 (Fig. 9) are mounted below the top of the frame 30 and carry a shaft 122 on which spools of wire as 123 are mounted, one spool as 123 being disposed substantially in vertical alignment with the spool 120 and the other spool as 123 being disposed substantially in vertical alignment with the spool 119.

A length of wire 124 is led from the spool 120 about a guide pulley 125 and a length of wire 126 is led from the aligned spool 123 about a guide pulley 127 that is disposed slightly out of vertical alignment with the pulley 125. The ends of these lengths of wire are initially intertwisted and the pulleys 125 and 127 are so disposed transversely of the machine that the lengths of wire 124 and 125 and their intertwisted ends lie outwardly of one end of the bottom plates 93 of the bundle receivers on the conveyor C. A length of wire 128 is led from the spool 119 and a length of wire (not shown) is led from the aligned spool as 123. These lengths of wire are passed about guide pulleys relatively positioned similarly to the guide pulleys 125 and 127 but on the opposite side of the conveyor so that the lengths of wire as 128 will lie outwardly of the opposite ends of the plates 93 of the bundle receivers.

The guide pulleys as 125 and 127 are so disposed longitudinally in the frame 30 and the location of the bundle receivers on the conveyor C is such that in an at rest interval in the step by step movement of the conveyor the leading edge of a bundle substantially abuts the intertwisted ends of the lengths of wire led from the spools.

A guide plate 129 (Figs. 9 and 12) is carried by the frame 30 and is spaced above the bottom plates 93 of the bundle receivers on the conveyor C. The end of this guide plate with which the bundles first cooperate as they move with the conveyor C is upturned to insure passage of the bundles thereunder. The guide plate 129 is so disposed vertically that the stacked blanks in the bundle receivers on the conveyor are tightly pressed against the bottom plates as 93. Hence the guide plate 129 is in the nature of a packing device and obviates looseness of the blanks in the bundles after passage thereof from the tying mechanism wherein the packed blanks are securely tied together.

The leading edge of a bundle engaged with the intertwisted ends of the wire lengths, as above described, is at position A in Fig. 9 and is disposed below the plate 129. In the next advancing movement of the conveyor the bundle moves from position A to position B in Fig. 9 and still lies below the plate 129. In advancing from position A to position B the intertwisted ends of the wire lengths are tightly engaged with the leading edge of the bundle and the adjacent portions of the wire lengths are drawn across the top and bottom of the bundle and are extended thereacross when the bundle attains position B.

As described in my above referred to copending application, the tying mechanism includes separable jaws as 130 and 131, a pair of such jaws being provided at each side of the conveyor C to cooperate with the wire lengths drawn across the bundles in the above described manner. The jaws are separated or open at the time a bundle passes from position A to position B in Fig. 9. Immediately after the bundle attains position B the jaws are closed to draw the wire lengths down over the trailing edge of the bundle.

Closing of the jaws in this manner is effected by a pair of integral and identical but oppositely formed cams 132 and 133 (Fig. 12) which are respectively engaged by cam followers 134 and 135. The cam follower 134 is mounted on a rocker 136 while the cam follower 135 is mounted on a rocker 137. The cam 132 controls the closing of the jaws cooperating with the wire lengths at the left in Fig. 12 while the cam 133 controls the closing of the jaws mounted at the right in Fig. 12. The rockers 136 and 137 are mounted on a shaft 138 suitably journaled in bearings 139 and 140 (Fig. 9). A link 141 interconnects the rocker 136 with the jaws 130 and 131 at the left in Fig. 12 through cooperating links 141a and 141b while a link 142 interconnects the rocker 137 with the jaws 130 and 131 at the right through cooperating links 141a and 141b. The cam followers 134 and 135 pass onto rises in the cams 132 and 133 immediately after a bundle attains position B in Fig. 9.

Each pair of jaws 130 and 131 includes separable gear halves which in the manner explained in my above referred to copending application sever and clamp the wire lengths upon closing of the jaws. Furthermore, closing of the jaws unites the gear halves so that they provide continuous gears and these gears are rotated to intertwist the wire lengths after the severing and clamping thereof to secure the wires on the bundle and to intertwist the wires leading from the spools for engagement with the leading edge of the succeeding bundle.

Rotative movement is not imparted to the gear halves until after the uniting thereof into continuous gears. The means for imparting rotative movement to these gear halves is under control of a cam 143 (Fig. 17) fast on the shaft 29 and engaged by a cam follower 144 carried by the rocker 145 mounted on the shaft 138, said cam follower being held against the periphery of the cam 143 by a spring 146 that extends between the rocker 145 and a spring anchor on the frame 30.

The gear halves in the jaws 130 and 121 at the right mesh with a gear 147 (Fig. 12) while the gear halves in the jaws 130 and 131 at the left mesh with a gear 148. The gear 147 is mounted on a shaft 149 while the gear 148 is mounted on a shaft 150, said shafts being suitably journaled in the frame 30. Near the forward end of the frame 30, shaft 149 carries a gear 151 while shaft 150 carries a gear 152. The gears 151 and 152 both mesh with a gear 153 (Figs. 9 and 17) that is rotatably mounted on a clutch member 154 keyed to the shaft 35. The clutch member 154 is part of a one-revolution clutch that is under control of the rockers 155 and 156 (Fig. 17). A link 157 interconnects the rocker 155 and the rocker 145. A disc 158 is fast to the gear 153 and has a notch 159 therein in which a stud 160 on the rocker 156 is adapted to seat, said stud being urged toward said notch by a spring 161.

When the cam follower 144 moves onto a rise in the cam 143, the rocker 155 is pivoted so that the clutch member 154 is connected to the gear 153 whereupon said gear rotates with the shaft 35 and this rotation is transmitted through the gears 151 and 152 to the shafts 149 and 150 which in turn rotate the gears 147 and 148 to set the separable gears in the jaws in motion whereupon the wire lengths are intertwisted, the gears 151, 152 and 153 making substantially three revolutions to one of the cam shaft 29. As the follower 144 moves off the rise on cam 143 the spring 161 so positions the stud 160 that it is in position to engage in the notch 159 and insure proper positioning of the gear 153 at the end of its third revolution, said stud 160 engaging the periphery of disc 158 to continue rotation until the stud seats in the notch. As soon as the gear 153 has completed its revolutions the cams 132 and 133 cause the jaws 130 and 131 to open whereupon intertwisted wire lengths are disposed in front of the leading edge of the succeeding bundle and shortly thereafter the conveyor indexes and the above described tying operation is completed.

In order to prevent overrunning of the shafts 149 and 150 and the parts driven thereby and also overrunning of the clutch device 154, adjustable friction tension devices 162, 163 and 164 (Fig. 16) are provided which act on these parts to arrest movement thereof immediately upon discontinuance of the supply of power thereto.

In the operation following the securing of the binding wires upon a bundle at position B, the bound bundle moves into position E (Fig. 9). In the succeeding cycle of operation the bundle at position E is discharged from the bundle receiver in which it has been retained onto downwardly inclined guides 165 (Figs. 9 and 13) to pass onto a ledge 166, said bundle coming to rest on said edge against the stop 167.

During the succeeding cycle of operation the bundle resting on the ledge 166 is forced into the bite between the curvature imparting rollers by the plunger 168 mounted in the bracket 169 disposed at one side of the frame 30. An opening 170 (Fig. 13) is provided in the plunger 168 in which a roller 171 is disposed, said roller being rotatably mounted at the free end of a rocker 172 pivotally mounted as indicated at 173 on the bracket 169.

A reciprocatory movement is imparted to the rocker 172 and hence the plunger 168 by a cam 174 fast on the cam shaft 29 and engaged by a cam follower roller 175 carried by the rocker 176 pivotally mounted on the frame 30 as indicated at 177. As best shown in Fig. 9 the rocker 176 is bifurcated and at the lower end thereof carries a rotatable stud 178. A link 179 has one end thereof connected to the rocker 172 and the opposite screw threaded end thereof is passed through an opening in the stud 178. Nuts 180 and 181 (Fig. 13) are mounted on the screw threaded end of the link 179 on opposite sides of the stud 178 and by adjusting the longitudinal position of said nuts on said link the relative position of the rockers 172 and 176 may be adjusted and consequently the amount of movement imparted to the rocker 172 and the plunger 168 from the rocker 176 may be regulated. A spring 182 acts on the link 179 to maintain the cam follower roller 175 in engagement with the cam 174. When the high part of the cam 174 engages the roller 175 the rocker 176 is pivoted counter-clockwise whereupon the plunger 168 moves to the right as viewed in Fig. 13 and forces the bound bundle resting on the ledge 166 into the bight of the curvature imparting rollers now to be described.

Two frame members 183 and 184 (Fig. 14) extend outwardly from the frame 30 on the opposite side of said frame from that at which the bracket 169 (Fig. 2) is mounted. A pair of rollers 185 and 186 each include trunnions respectively journaled in the frame members 183 and 184, said rollers being mounted in horizontal alignment and having the upper portions of the peripheries thereof disposed slightly above the horizontal plane of the ledge 166. Slots 187 and 188 extend into the frame members 183 and 184 from the top sides thereof and blocks 189 and 190 are respectively mounted in these slots for vertical movement therein. A plate 191 extends between the frame members 183 and 184 at the top sides thereof and closes the slots 187 and 188. Adjusting screws 192 and 193 are mounted in the plate 191 and are respectively connected to the blocks 189 and 190.

The rollers 185 and 186 are mounted in spaced apart relation and the blocks 189 and 190 are positioned to lie substantially midway between the vertical center planes of said rollers 185 and 186 and above the horizontal center plane of said rollers wherefore a roller 194 having trunnions thereon mounted in the blocks 189 and 190 lies between and above the rollers 185 and 186. By adjusting the vertical position of the adjusting screws 192 and 193 the spacing or bite between the roller 194 and the rollers 185 and 186 may be adjusted. This adjustment determines the amount of curvature imparted to a bundle forced forwardly by the plunger 168 to pass between the roller 194 and the rollers 185 and 186.

The rollers 185, 186 and 194 are preferably longitudinally fluted to insure imparting of feeding movement to a bundle passed into the bite therebetween. Feeding movement is imparted to the rollers 185 and 186 from a shaft 195 having a gear 196 thereon that meshes with gears 197 and 198 respectively fast on trunnions of the rollers 185 and 186. Power is supplied to the shaft 195 from the motor 31 through belts 199 that pass about the pulley 32 and a pulley 200 fast on the shaft 195.

By adjusting the relative vertical position of the roller 194 with respect to the rollers 185 and 186 the amount of curvature imparted to a bundle may be varied. As the bundles pass from the rollers 185, 186 and 194 they may fall into a discharge chute or be picked up by an operative of the machine to be stacked and transported to a suitable storage place or the like.

From the foregoing description it will be manifest that I have provided a machine into which sheets of expanded metal are automatically fed and wherein such sheets will be so cut that blanks of uniform size are produced. The blanks are collected as they are cut from the sheets and are neatly stacked in bundles which are tightly packed and then securely bound. After having been bound the bundles are fed into means for imparting a predetermined curvature thereto. It will thus be manifest that inserts for brake shoe and like castings or other articles may be produced from sheets of expanded metal or the like without the necessity of operatives unduly handling the material for all that the operatives need do is to insure that the machine be supplied with sheets of expanded metal or the like and to remove the completed articles at the discharge end of the machine, the operatives of course taking care that a supply of binding wires or the like are maintained in the machine to insure that the stacked blanks cut from the sheets will be securely bound into bundles that may be handled as units.

Figure 18:
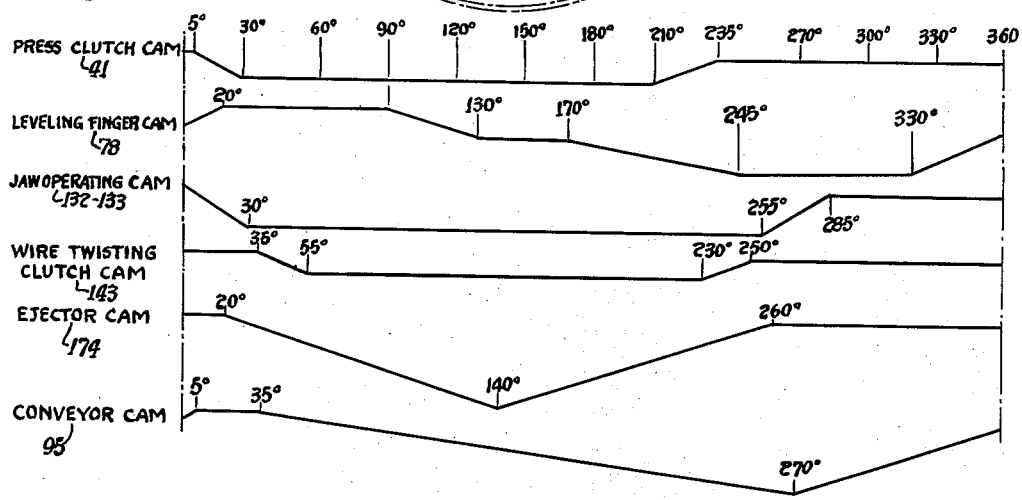
Fig. 18 is a timing chart illustrating the relative operative times of the various operating parts of the machine.

One of the important objects of this invention is to enable various operating parts of the machine to operate simultaneously. Thus referring to Fig. 18 and assuming that the machine has been in operation so that each of the bundle receivers along the upper reaches of the chains 85 and 86, except the bundle receivers aligned with the pads 75, are carrying bundles and also assuming that a bundle is resting on the ledge 166, at the start of the next cycle of operation the cam follower 42 will be riding on the rise on the cam 41 near the end of the rise, the roller 77 will be riding up the sharp rise on the cam 78, the cam followers 134 and 135 will be disposed near the end of the low parts of the cams 132 and 133, the cam follower 144 will be spaced from the rise on the cam 143, the cam follower 175 will be riding on the dwell of the cam 174, and the cam follower 102 will be nearing the end of the rise on the cam 95.

With the parts in these positions and with the motors 24 and 31 in operation, after five degrees of revolution of the cam shaft 29 the cam follower 102 will have passed from the rise on cam 95 and the conveyor will be at rest so that a pair of bundle receivers will be in position to receive the blanks to be stacked upon the pads 75 in this cycle of operation.

Also after five degrees of rotation of cam shaft 29 the cam follower 42 will begin to pass onto the low part of cam 41 and after thirty degrees of revolution of the cam shaft 29 it will reach the low part of said cam at which time the rocker 39 will have moved the link 38 downwardly to have retracted the dog 28 and set the shaft 21 in operation and as a result of this the first blanks will be cut from the sheets S.

The roller 70 will continue riding up the sharp rise on the cam 78 and, after about twenty degrees of revolution of the cam shaft 29, the pads 75 will have been elevated into their uppermost or initial position so as to be in position to receive the first of the blanks cut from the sheets S, which first blanks will be cut from the sheets prior to the time the cam shaft 29 will have rotated ninety degrees.

Upon the start of a cycle of operation the cam followers 134 and 135 start to move onto rises on the cams 132 and 133 so that after thirty degrees of movement of the cam shaft 29 the jaws 130 and 131 will be completely closed. Further, after thirty-five degrees of movement of the cam shaft, the cam follower 144 starts to move onto the rise on cam 143 so that after fifty-five degrees of rotation of the cam shaft the shafts 149 and 150 will be set in rotation which means that the operable gears in the jaws 130 and 131 do not start to rotate until the jaws are completely closed and the gear halves therein are united.

After twenty degrees of rotation of the cam shaft 29 the cam follower 175 starts to move up on the rise on cam 174 wherefore the plunger 168 begins its movement toward the bundle resting on the ledge 166 and by the time the cam shaft 29 has rotated one hundred forty degrees the plunger 168 will have completed its movement toward the right and the bundle which has been resting on the ledge 166 will be gripped between and be fed by the rollers 194 and 185 and 186 and at this time the plunger 168 starts to move to the left as viewed in Fig. 13 and said plunger attains its initial position by the time the cam shaft 29 has rotated two hundred sixty degrees in which position it dwells until the succeeding cycle of operation. The bundle fed to the rollers 194 and 185 and 186 has a predetermined curvature imparted thereto longitudinally thereof as it passes between the roller 194 and the rollers 185 and 186.

The cam follower 42 remains on the relieved part of cam 41 wherefore the press P continues in operation until the cam shaft 29 has rotated about two hundred ten degrees whereupon the follower 42 starts to move onto the rise on cam 41 which position is attained slightly after the cam shaft has rotated two hundred thirty-five degrees. Prior to this time however the roller 77 will move from the highest part of the cam 78 onto the next lowermost part, said roller starting this movement after the cam shaft has rotated ninety degrees and dwelling on this next lowermost part while the cam shaft rotates from its one hundred thirty degree position to its one hundred seventy degree position during which time the second blank is deposited on the blank already resting on the pads 75. Furthermore, during the time the cam shaft is rotating from its one hundred seventy degree position to its two hundred forty-five degree position the roller 77 moves onto the lowermost portion of the cam 78 on which portion it dwells until the three hundred thirty degree position of the cam shaft is attained at which time it starts up on the sharp rise of cam 78, the third of the blanks cut from the sheets S being deposited on the blanks already resting on the pads 75 when the roller 77 is engaging the lowermost portion of the cam 78.

When the cam shaft has rotated two hundred forty degrees the cam follower 144 moves toward the relieved part of the cam 143 and when the cam shaft has rotated two hundred fifty degrees said cam follower moves onto the relieved part of said cam wherefore movement imparted to the shafts 149 and 150 is interrupted since by this time the stud 160 will be seated in the notch 159. Furthermore, when the cam shaft is rotated two hundred fifty-five degrees the cam followers 134 and 135 start to move onto the relieved parts of cams 132 and 133 and consequently start to open the jaws 130 and 131 and by the time the cam shaft has rotated two hundred eighty-five degrees the jaws 130 and 131 are completely open and the cam followers 134 and 135 ride on dwells on the cams 132 and 133 until the start of the next cycle of operation.

As stated above, movement of the conveyor is interrupted after five degrees of movement of the cam shaft 29 in a given cycle of operation and the cam follower 102 rides on a dwell on the cam 95 until the cam shaft has rotated thirty-five degrees whereupon the cam 95 so acts on the cam follower 102 that the rocker 101 is moved upwardly at which time the pawl 106 freely rides over the teeth in the ratchet 104 and when the cam shaft has rotated two hundred seventy degrees the cam 95 acts on the roller 102 to move the rocker 101 downwardly whereupon the conveyor is set in motion which continues until five degrees of movement in the succeeding cycle of operation have been completed at which time downward movement of the rocker 101 under influence of the cam 95 will cease. It will be apparent however from reference to Fig. 18 that the conveyor C does not start in a cycle of operation until all the other parts have been so positioned that likelihood of conflict is avoided.

Thus from the foregoing it will be seen that by the use of a single cam shaft and the provision of properly formed cams thereon I am enabled to effect simultaneous operation of a plurality of operating devices in the machine which expedites operation and insures rapid production of inserts or the like in the machine.

It will be apparent from the foregoing description that substantially all of the operations are effected automatically, it only being necessary to manually supply sheets to the machine and to manually remove the finished articles therefrom. Neither of these operations requires particular dexterity wherefore the operatives may wear relatively heavy gloves and, as a result, cutting of the operatives' hands by sharp edges or corners on the material is obviated. Furthermore, the machine operates to automatically feed sheets into the machine and to completely perform all of the necessary operations to form articles from the sheets which avoids the necessity of handling the material and enables economical manufacture.

In the foregoing description I have described my invention as particularly adapted for forming inserts for brake shoes or similar castings from expanded metal but it is to be understood that the invention is not limited to such usage but is especially adapted for usage in those instances where articles are to be made from material that is difficult to handle or likely to injure the hands or tear the clothing of operatives, or the like, and therefore I am not to be limited to the precise details set forth but desire to avail myself of such changes and alterations as fall within the purview of the following claims.

I claim:

1. In a machine of the class described, means for severing blanks from sheet material, receiving means on which the severed blanks are deposited, means for lowering the receiving means from an initial blank receiving position and for restoring such means to such position and operable to lower the receiving means in an amount substantially equal to the thickness of the blanks intermediate passage of the blanks thereto whereby neat stacking of the blanks one upon the other on said receiving means is insured, and means for removing the blanks from said receiving means after a predetermined number of blanks have been stacked thereon, the means for lowering and restoring the receiving means operating to restore the receiving means to its initial blank receiving position after the means for removing a stack of blanks therefrom has removed such a stack of blanks.

2. In a machine of the class described, means for severing blanks from sheet material, receiving means on which the severed blanks are deposited, means for lowering the receiving means from an initial blank receiving position and for restoring such means to such position and operable to lower the receiving means in an amount substantially equal to the thickness of the blanks intermediate passage of the blanks thereto whereby neat stacking of the blanks one upon the other on said receiving means is insured, and means for removing the blanks from said receiving means after a predetermined number of blanks have been stacked thereon, said means for lowering and restoring said receiving means operating to restore said receiving means to its initial blank receiving position after removal of said blanks therefrom by said blank removing means.

3. In a machine of the class described, severing means, receiving means on which blanks severed by the severing means are stacked, and means for effecting cyclic operation of the machine and said severing and said receiving means and including means for effecting a plurality of operations of said severing means in a single cycle of operation of said machine whereby a plurality of blanks are severed in each cycle of operation, the cyclic operation effecting means also including means for lowering said receiving means from an initial blank receiving position and for restoring such means to such position and operable to lower the receiving means in an amount substantially equal to the thickness of the blanks intermediate severing operations of said severing means whereby neat stacking of the blanks one upon the other on said receiving means is insured, the means for lowering and restoring said receiving means operating to restore the receiving means to its initial blank receiving position after a predetermined number of blanks have been stacked thereon.

4. In a machine of the class described, severing means, receiving means on which blanks severed by the severing means are stacked, means for effecting cyclic operation of the machine and said severing and said receiving means and including means for effecting a plurality of operations of said severing means in a single cycle of operation of said machine whereby a plurality of blanks are severed in each cycle of operation, the cyclic operation effecting means also including means for lowering said receiving means from an initial blank receiving position and for restoring such means to such position and operable to lower the receiving means in an amount substantially equal to the thickness of the blanks intermediate severing operations of said severing means whereby neat stacking of the blanks one upon the other on said receiving means is insured, and means operable in each cycle of operation of the machine to remove said plurality of blanks from said receiving means, the means for lowering and restoring the receiving means operating to restore the receiving means to its initial blank receiving position after the means for removing a stack of blanks therefrom has removed such a stack of blanks.

5. In a machine of the class described, severing means, receiving means on which blanks severed by the severing means are stacked, means for effecting cyclic operation of the machine and said severing and said receiving means and including means for effecting a plurality of operations of said severing means in a single cycle of operation of said machine whereby a plurality of blanks are severed in each cycle of operation, the cyclic operation effecting means also including means for lowering said receiving means from an initial blank receiving position and for restoring such means to such position and operable to lower the receiving means in an amount substantially equal to the thickness of the blanks intermediate severing operations of said severing means whereby neat stacking of the blanks one upon the other on said receiving means is insured, and means operable in each cycle of operation of the machine to remove said plurality of blanks from said receiving means, said means for lowering and restoring said receiving means operating in each cycle of operation to restore said receiving means to initial blank receiving position after removal of the blanks therefrom by said blank removing means.

6. In a machine of the class described, severing means, operating means for operating said severing means, means for feeding sheet material to said severing means, means for operating said feeding means from said operating means to advance a predetermined amount of said sheet material past said severing means whereby a blank of predetermined size is cut from said material in each severing operation of said severing means, receiving means for said blanks, and means for lowering said receiving means from an initial blank receiving position and for restoring such means to such position and operable to lower the receiving means intermediate severing operations of said severing means whereby neat stacking of the blanks one upon the other on said receiving means is insured, the means for lowering and restoring said receiving means operating to restore the receiving means to its initial blank receiving position after a predetermined number of blanks have been stacked thereon.

7. In a machine of the class described, severing means, operating means for operating said severing means, means for feeding sheet material to said severing means, means for operating said feeding means from said operating means to advance a predetermined amount of said sheet material past said severing means intermediate severing operations of said severing means whereby blanks of predetermined size are cut from said material in the respective severing operations of said severing means, receiving means for said blanks, and means for effecting cyclic operation of said machine and including means controlling operation of said operating means and operable to effect a plurality of operations of said feeding means and a plurality of severing operations of said severing means in each cycle of operation of the machine, the cyclic operation effecting means also including means for lowering said receiving means from an initial blank receiving position and for restoring such means to such position and operable to lower the receiving means in an amount substantially equal to the thickness of the blanks intermediate severing operations of said severing means whereby neat stacking of the blanks one upon the other on said receiving means is insured, the means for lowering and restoring the receiving means operating subsequent to the last feeding and severing operations in a cycle of operations to restore the receiving means to its initial blank receiving position.

8. In a machine of the class described, severing means, operating means for operating said severing means, means for feeding sheet material to said severing means, means for operating said feeding means from said operating means to advance a predetermined mount of said sheet material past said severing means intermediate severing operations of said severing means whereby blanks of predetermined size are cut from said material in the respective severing operations of said severing means, receiving means for said blanks, means for effecting cyclic operation of said machine and including means controlling operation of said operating means and operable to effect a plurality of operations of said feeding means and a plurality of severing operations of said severing means in each cycle of opertaion of the machine, the cyclic operating effecting means also including means for lowering said receiving means from an initial blank receiving position and for restoring such means to such position and operable to lower the receiving means in an amount substantially equal to the thickness of the blanks intermediate severing operations of said severing means whereby neat stacking of the blanks one upon the other on said receiving means is insured, and means for removing the blanks stacked on said receiving means in each cycle of operation of the machine, the means for lowering and restoring the receiving means operating to restore the receiving means to its initial blank receiving position after the means for removing a stack of blanks therefrom has removed such a stack of blanks.

9. In a machine of the class described, severing means, operating means for operating said severing means, means for feeding sheet material to said severing means, means for operating said feeding means from said operating means to advance a predetermined amount of said sheet material past said severing means intermediate severing operations of said severing means whereby blanks of predetermined size are cut from said material in the respective severing operations of said severing means, receiving means for said blanks, means for effecting cyclic operation of said machine and including means controlling operation of said operating means and operable to effect a plurality of operations of said feeding means and a plurality of severing operations of said severing means in each cycle of operation of the machine, the cyclic operating effecting means also including means for lowering said receiving means in an amount substantially equal to the thickness of the blanks intermediate severing operations of said severing means whereby neat stacking of the blanks one upon the other on said receiving means is insured, and means for removing the blanks stacked on said receiving means in each cycle of operation of the machine, said cyclic operation effecting means including means for operating said blank removing means.

10. In a machine of the class described, severing means, operating means for operating said severing means, means for feeding sheet material to said severing means, means for operating said feeding means from said operating means to advance a predetermined amount of said sheet material past said severing means intermediate severing operations of said severing means whereby blanks of predetermined size are cut from said material in the respective severing operations of said severing means, receiving means for said blanks, means for effecting cyclic operation of said machine and including means controlling operation of said operating means and operable to effect a plurality of operations of said feeding means and a plurality of severing operations of said severing means in each cycle of operation of the machine, the cyclic operating effecting means also including means for lowering said receiving means from an initial blank receiving position and for restoring such means to such position and operable to lower the receiving means in an amount substantially equal to the thickness of the blanks intermediate severing operations of said severing means whereby neat stacking of the blanks one upon the other on said receiving means is insured, and means for removing the blanks stacked on said receiving means in each cycle of operation of the machine, said cyclic operation effecting means including means for operating said blank removing means, said means for lowering and restoring said receiving means operating in each cycle of operation of the machine to restore said receiving means to initial blank receiving position after removal of said blanks therefrom by said blank removing means.

11. In a machine of the class described, a conveyor, severing means, operating means for said severing means, means for effecting cyclic operation of said machine and including means for controlling the operation of said operating means and operable to effect a plurality of operations of said severing means in each cycle of operation of the machine whereby said severing means cuts a plurality of blanks in each cycle of operation, means for collecting and depositing such plurality of blanks on the conveyor, said cyclic operation effecting means including means for imparting a step by step movement to said conveyor, the means on said cyclic operation effecting means operating to advance said conveyor once in each cycle of operation of said machine whereby each plurality of blanks severed in each cycle of operation of the machine is deposited in spaced relation with each other on said conveyor, said cyclic operation effecting means including means for lowering and restoring said collecting and depositing means from and to an initial position in each cycle of operation of the machine and operable to lower such means intermediate severing operations of said severing means in an amount substantially equal to the thickness of the blanks cut by said severing means whereby neat stacking of the blanks and depositing thereof on the conveyor are insured, the lowering and restoring means operating to restore the collecting and depositing means to its initial position after a stack of blanks have been deposited thereby on the conveyor.

12. In a machine of the class described, a conveyor, severing means, operating means for said severing means, means for effecting cyclic operation of said machine and including means for controlling the operation of said operating means and operable to effect a plurality of operations of said severing means in each cycle of operation of the machine whereby said severing means cuts a plurality of blanks in each cycle of operation, means for collecting and depositing such plurality of blanks on the conveyor, said cyclic operation effecting means including means for imparting a step by step movement to said conveyor, the means on said cyclic operation effecting means operating to advance said conveyor once in each cycle of operation of said machine whereby each plurality of blanks severed in each cycle of operation of the machine is deposited in spaced relation with each other on said conveyor, other means on the cyclic operation effecting means for operating the collecting and depositing means, and means for tightly packing the blanks stacked on said conveyor one upon the other and positioned forwardly of the severing means to be engaged by said blanks in the step by step movement of said conveyor after said conveyor moves said blanks away from said severing means.

13. In a machine of the class described, a conveyor, severing means, operating means for said severing means, means for effecting cyclic operation of said machine and including means for controlling the operation of said operating means and operable to effect a plurality of operations of said severing means in each cycle of operation of the machine whereby said severing means cuts a plurality of blanks in each cycle of operation, means for collecting and depositing such plurality of blanks on the conveyor, said cyclic operation effecting means including means for imparting a step by step movement to said conveyor, the means on said cyclic operation effecting means operating to advance said conveyor once in each cycle of operation of said machine whereby each plurality of blanks severed in each cycle of operation of the machine is deposited in spaced relation with each other on said conveyor, other means on the cyclic operation effecting means for operating the collecting and depositing means, means for tightly packing the blanks stacked on said conveyor one upon the other and positioned forwardly of the severing means to be engaged by said blanks in the step by step movement of said conveyor after said conveyor moves said blanks away from said severing means, and means cooperating with the packing means for applying binding means about the packed stacks of blanks whereby said stacks may be handled as units after passage thereof from the means applying binding means thereto.

14. In a machine of the class described, a conveyor, severing means, operating means for said severing means, means for effecting cyclic operation of said machine and including means for controlling the operation of said operating means and operable to effect a plurality of operations of said severing means in each cycle of operation of the machine whereby said severing means cuts a plurality of blanks in each cycle of operation, means for collecting and depositing such plurality of blanks on the conveyor, said cyclic operation effecting means including means for imparting a step by step movement to said conveyor, the means on said cyclic operation effecting means operating to advance said conveyor once in each cycle of operation of said machine whereby each plurality of blanks severed in each cycle of operation of the machine is deposited in spaced relation with each other on said conveyor, other means on the cyclic operation effecting means for operating the collecting and depositing means, means for tightly packing the blanks stacked on said conveyor one upon the other and positioned forwardly of the severing means to be engaged by said blanks in the step by step movement of said conveyor after said conveyor moves said blanks away from said severing means, and means cooperating with the packing means for applying binding means about the packed stacks of blanks whereby said stacks may be handled as units after passage thereof from the means applying binding means thereto, said cyclic operation effecting means including means for controlling the operation of the means for applying binding means on said stacks.

15. In a machine of the class described, a conveyor, severing means, operating means for said severing means, means for effecting cyclic operation of said machine and including means for controlling the operation of said operating means and operable to effect a plurality of operations of said severing means in each cycle of operation of the machine whereby said severing means cuts a plurality of blanks in each cycle of operation, means for collecting and depositing such plurality of blanks on the conveyor, said cyclic operation effecting means including means for imparting a step by step movement to said conveyor, the means on said cyclic operation effecting means operating to advance said conveyor once in each cycle of operation of said machine whereby each plurality of blanks severed in each cycle of operation of the machine is deposited in spaced relation with each other on said conveyor, other means on the cyclic operation effecting means for operating the collecting and depositing means, and tying means positioned along the path of travel of said conveyor away from said severing means and operable to apply binding means on the stacks of blanks positioned on said conveyor, said tying means being arranged to dispose the binding means in the path of travel of the stacks of blanks on said conveyor whereby the binding means are drawn over opposite sides of a stack of blanks on said conveyor in the step by step movement of the conveyor, said tying means also including means for severing the binding means from supplies thereof in the machine and for securing said binding means on the stack of blanks about which the binding means have been drawn across the stacks and also operating to dispose said binding means in position for engagement with the succeeding stack of blanks, said cyclic operation effecting means also including means for controlling operation of said tying means.

WILLIAM S. FRAULA.